US011220032B2

(12) United States Patent
Watanabe et al.

(10) Patent No.: US 11,220,032 B2
(45) Date of Patent: Jan. 11, 2022

(54) SPRUE-BUSH AND METHOD FOR MANUFACTURING SPRUE-BUSH

(71) Applicant: PANASONIC INTELLECTUAL PROPERTY MANAGEMENT CO., LTD., Osaka (JP)

(72) Inventors: Shinya Watanabe, Hyogo (JP); Satoshi Abe, Osaka (JP); Kenichi Tanaka, Osaka (JP); Mikio Mori, Osaka (JP); Yoshiyuki Uchinono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 16/313,781

(22) PCT Filed: Jun. 28, 2017

(86) PCT No.: PCT/JP2017/023811
§ 371 (c)(1),
(2) Date: Dec. 27, 2018

(87) PCT Pub. No.: WO2018/003881
PCT Pub. Date: Jan. 4, 2018

(65) Prior Publication Data
US 2019/0224898 A1    Jul. 25, 2019

(30) Foreign Application Priority Data

Jun. 29, 2016 (JP) .............................. JP2016-129264

(51) Int. Cl.
*B29C 45/27* (2006.01)
*B22F 10/20* (2021.01)
(Continued)

(52) U.S. Cl.
CPC .......... *B29C 45/2737* (2013.01); *B22F 10/20* (2021.01); *B29C 33/3842* (2013.01);
(Continued)

(58) Field of Classification Search
CPC ... B29C 45/2737; B29C 45/27; B22F 3/1055; B33Y 80/00; B33Y 10/00
See application file for complete search history.

(56) References Cited

FOREIGN PATENT DOCUMENTS

| CN | 1241479 | 1/2000 |
|---|---|---|
| CN | 102282002 | 12/2011 |

(Continued)

OTHER PUBLICATIONS

European Extended Search Report in corresponding European Application No. 17820235.4, dated May 9, 2019.
(Continued)

*Primary Examiner* — Joseph S Del Sole
*Assistant Examiner* — Mohamed K Ahmed Ali
(74) *Attorney, Agent, or Firm* — Greenblum & Bernstein, P.L.C.

(57) ABSTRACT

To manufacture a sprue-bush which is capable of suitably cooling a melt raw resin in a raw resin-flow path as a whole, there is provided a method for manufacturing a sprue-bush, wherein a shaped part is located on a base part to manufacture the sprue-bush, the base part comprising a raw resin-flow path and a cooling medium-flow path, wherein, in the shaped part, a downstream raw resin-flow path portion is located and a downstream cooling medium-flow path portion is also located, the downstream raw resin-flow path portion corresponding to a downstream side region of a raw resin-flow path of the sprue-bush, the downstream cooling medium-flow path portion being positioned around the downstream raw resin-flow path portion and corresponding to a downstream side region of a cooling medium-flow path (Continued)

of the sprue-bush, and wherein the downstream cooling medium-flow path portion is located to surround the downstream raw resin-flow path portion.

7 Claims, 11 Drawing Sheets

(51) Int. Cl.
  *B33Y 80/00* (2015.01)
  *B29C 33/38* (2006.01)
  *B33Y 10/00* (2015.01)
(52) U.S. Cl.
  CPC .............. *B29C 45/27* (2013.01); *B33Y 80/00* (2014.12); *B29K 2905/00* (2013.01); *B33Y 10/00* (2014.12)

(56) References Cited

FOREIGN PATENT DOCUMENTS

| | | | |
|---|---|---|---|
| CN | 103495734 | | 1/2014 |
| EP | 0967062 | | 12/1999 |
| JP | 5001289 B | * | 1/1993 |
| JP | 06-158113 | | 6/1994 |
| JP | 2003-220634 | | 8/2003 |
| JP | 2010-194719 | | 9/2010 |
| JP | 2010194719 A | * | 9/2010 |
| JP | 5576732 | | 2/2012 |
| JP | 2015-074185 | | 4/2015 |
| JP | 2015-224363 | | 12/2015 |
| JP | 2016-002698 | | 1/2016 |
| WO | 2008/038694 | | 4/2008 |
| WO | 2010-082331 | | 7/2010 |
| WO | 2013/002543 | | 1/2013 |

OTHER PUBLICATIONS

Anonymous, "Selective laser sintering Wikipedia", Apr. 10, 2016, XP055584174, https://en.wikipedia.org/w/index.php?title=Selective_laser_sintering&oldid+714526189.

Official Action in Chinese application No. 201780040551.2 dated May 22, 2020, along with partial English translation.

Official communication in European Patent Application EP 17820235.4 dated Apr. 22, 2020.

Official Communication issued in WIPO Patent Application No. PCT/JP2017/023811, dated Aug. 15, 2017, along with English translation.

English translation of Official Communication issued in WIPO Patent Application No. PCT/JP2017/023811, dated Jan. 1, 2019.

Chinese Office Action including Chinese Search Report issued in counterpart Chinese Patent Application No. 201780040551.2, dated Feb. 1, 2021, along with English Translation of Chinese Search Report.

Japanese Office Action issued in counterpart Japanese Patent Application No. 2017-215865, dated Feb. 16, 2021, along with English translation.

Office Action and Search Report from China National Intellectual Property Administration in Chinese Patent Application No. 201780040551.2, dated May 6, 2021, together with an English language translation of the Office Action and the Search Report.

* cited by examiner

SPRUE-BUSH AND METHOD FOR MANUFACTURING SPRUE-BUSH

TECHNICAL FIELD

The disclosure relates to a sprue-bush and a method for manufacturing the sprue-bush. More particularly, the disclosure relates to a sprue-bush which is used in a mold and a method for manufacturing the sprue-bush.

BACKGROUND OF THE INVENTION

Technologies supporting "manufacturing" industry in Japan includes a molding technology using molds. The molding technology includes a pressure molding method, an injection molding method, and an extrusion molding method. In these molding methods, the injection molding method is a method for obtaining a molded article from a melt raw resin using a mold for an injection mold.

In the injection molding method, a melt raw resin is injected into a mold cavity 203' composed of the one of molds (i.e., core side mold) 201' of an injection mold 200' and the other of molds (i.e., cavity mold) 202' thereof (see FIG. 11). The injected melt raw resin is subjected to a cooling followed by a solidification in a mold cavity 203' to form a molded article. An injection of the melt raw resin into the mold cavity 203' is generally performed via a sprue-bush 100'.

As shown in FIG. 11, the sprue bush 100' used for the injection mold 200' has a raw resin-flow path 10' therein. The raw resin-flow path 10' extends from an upstream side-beginning portion 10a' into which the melt raw resin is supplied to a downstream side-end portion 10b' leading into the mold cavity 203'.

The raw resin-flow path 10' is in a form of a taper to make an ejection of the molded article easier. Specifically, a width dimension W' of the raw resin-flow path 10' gradually increases as it extends from the upstream side-beginning portion 10a' to the downstream side-end portion 10b'. As shown in FIG. 11, a width dimension $W_1'$ of an upstream side 10α' of the raw resin-flow path 10' is relatively small, whereas a width dimension $W_2'$ of a downstream side 10β' of the raw resin-flow path 10' is relatively large.

The raw resin-flow path 10' in the form of the taper is preferable in view of the ejection of the molded article, however it may not be necessarily preferable in view of the cooling followed by the solidification of the melt raw resin. For example, in a case where the raw resin-flow path 10' in the form of the taper has a longer length, it may largely affect the downstream side having a relatively large width dimension W'. Namely, it may make the cooling and subsequent solidification of the melt raw resin difficult. In a case that the cooling and subsequent solidification of the melt raw resin are difficult, it may cause an increase of a necessary time from the injection of the melt raw resin to the ejection of the molded article, which may make a molding cycle longer. Accordingly, as shown in FIG. 11, a cooling medium-flow path flow path 20' having a configuration of a straight pipe may be located around the raw resin-flow path 10'.

PATENT DOCUMENTS (RELATED ART PATENT DOCUMENTS)

Patent Document 1: WO 2008-038694

DISCLOSURE OF THE INVENTION

Problems to be Solved by the Invention

However, the sprue bush 100' having the cooling medium-flow path 20' with its configuration of the straight pipe therein may cause the following problems.

Specifically, the width dimension W' of the raw resin-flow path 10' in the form of the taper gradually becomes larger toward its downstream side. Thus, a surface area of a portion having a relatively larger width dimension becomes larger than that of a portion having a relatively smaller width dimension. The larger surface area makes a region for transferring a cooling heat larger, the cooling heat being necessary to cool and subsequently solidify the melt raw resin in the portion having the relatively larger width dimension. Thus, a use of the cooling medium-flow path 20' having the configuration of the straight pipe causes the cooling heat not to sufficiently transfer to the melt raw resin in the portion having the relatively larger width dimension, the cooling heat being due to the cooling medium passing through the cooling medium-flow path 20'. As a result, there is a possibility that the melt raw resin in the raw resin-flow path 10' cannot suitably be cooled and subsequently solidified as a whole.

Under these circumstances, the present invention has been created. That is, an object of the present invention is to provide a sprue-bush which is capable of suitably cooling a melt raw resin in a raw resin-flow path and a method for manufacturing the sprue-bush as a whole.

Means for Solving the Problems

In order to achieve the above object, an embodiment of the present invention provides a method for manufacturing a sprue-bush,
wherein a shaped part is located on a base part to manufacture the sprue-bush, the base part comprising a raw resin-flow path and a cooling medium-flow path,
wherein, in the shaped part, a downstream raw resin-flow path portion is located and a downstream cooling medium-flow path portion is also located, the downstream raw resin-flow path portion corresponding to a downstream side region of a raw resin-flow path of the sprue-bush, the downstream cooling medium-flow path portion being positioned around the downstream raw resin-flow path portion and corresponding to a downstream side region of a cooling medium-flow path of the sprue-bush, and
wherein the downstream cooling medium-flow path portion is located to surround the downstream raw resin-flow path portion.

In order to achieve the above object, an embodiment of the present invention provides a sprue-bush, comprising a raw resin-flow path and a cooling medium-flow path located around the raw resin-flow path,
wherein the sprue-bush is composed of a base part and a shaped part, the shaped part being located on the base part,
wherein the base part has an upstream raw resin-flow path portion and an upstream cooling medium-flow path, the upstream raw resin-flow path portion corresponding to an upstream side region of the raw resin-flow path, the upstream cooling medium-flow path portion being positioned around the upstream raw resin-flow path portion and corresponding to an upstream side region of the cooling medium-flow path, wherein the shaped part has a downstream raw resin-flow path portion and a downstream cooling medium-flow path portion, the downstream raw resin-flow path portion corresponding to a downstream side region of the raw resin-flow path, the downstream cooling medium-flow path portion being positioned around the downstream raw resin-flow path portion and corresponding to a downstream side region of the cooling medium-flow path, and wherein the downstream cooling medium-flow path portion of the shaped part is located to surround the downstream raw resin-flow path portion.

Effect of the Invention

In the sprue-bush according to the present invention, it is possible to suitably cool the melt raw resin in the raw resin-flow path.

MODES FOR CARRYING OUT THE INVENTION

Figure 1:
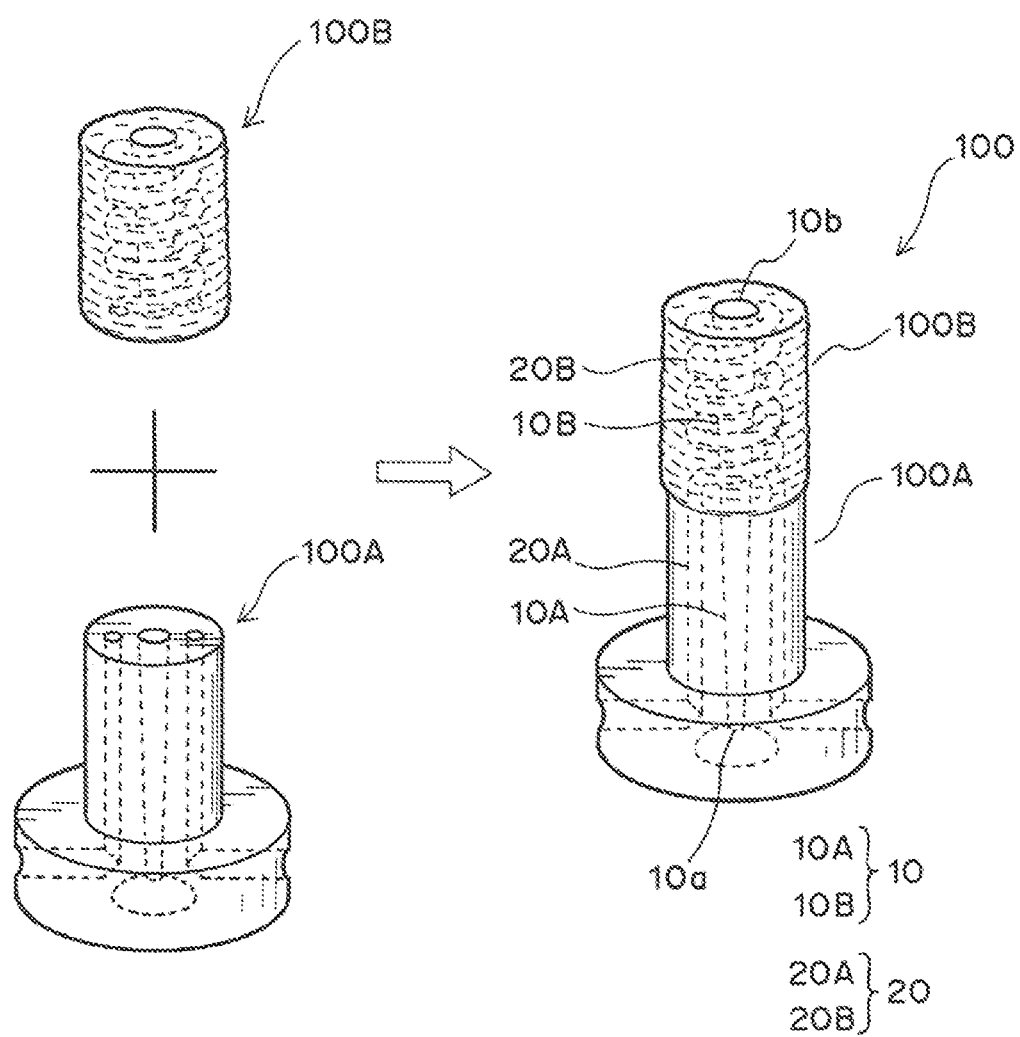
FIG. 1 is a perspective view schematically showing a sprue-bush according to the present invention.

An embodiment of the present invention will be described in detail with reference to the accompanying drawings. It should be noted that forms and dimensions in the drawings are merely for illustrative purposes, and thus not the same as those of the actual parts or elements.

The present invention is based on such a technical idea that a sprue bush to be finally obtained is composed of at least two parts (i.e., a base part and a shaped part). The "base part" as used herein substantially means an existing sprue-bush. Since the base part substantially means the existing sprue-bush, the base part can be used as an injection molding part even if another part (i.e., the shaped part) is not intentionally located on the base part itself. Nonetheless, the present invention is characterized in that the sprue-bush to be finally obtained is intentionally composed of at least two parts (i.e., the base part and the shaped part).

As shown in FIG. 1, the sprue-bush 100 according to an embodiment of the present invention is obtained by a combination of a base part 100A and a shaped part 100B, the shaped part 100B being configured to be positioned on the base part 100A. Although not being shown in FIG. 1, after the shaped part 100B is positioned on the base part 100A, a surface thereof may be subjected to a machine process. As shown in the drawing, the sprue-bush 100 includes a raw resin-flow path 10 and a cooling medium-flow path 20 therein, the cooling medium-flow path 20 being located around the raw resin-flow path 10. The raw resin-flow path 10 is configured such that its width-dimension gradually increases from an upstream side-beg inning portion 10a toward a downstream side-end portion 10b in terms of an easy ejection of a molded article to be finally obtained.

The "cooling medium-flow path 20 of the sprue-bush 100" is a flow path for flowing the cooling medium and is a flow path which contributes to a cooling of a melt raw resin in the raw resin-flow path 10. That is, at the time of molding, a temperature of the melt raw resin in raw resin-flow path 10 is decreased due to the cooling medium flowing through the cooling medium-flow path 20. The "cooling medium" as used herein means a fluid capable of giving a cooling effect to the melt raw resin in the raw resin-flow path 10, the fluid corresponding to cooling water or cooling gas for example. The "upstream side of the raw resin-flow path 10" as used herein means a portion located on a proximal side with respect to the upstream side-beginning portion 10a into which the melt raw resin is supplied. On the other hand, the "downstream side of the raw resin-flow path 10" as used herein means a portion located on a distal side with respect to the upstream side-beginning portion 10a into which the melt raw resin is supplied. Although a boundary between the upstream side and the downstream side of the raw resin-flow path is not particularly limited, the boundary is a half division portion of a height of the sprue-bush of the present invention. More specifically, "the upstream side of the raw resin-flow path 10" corresponds to a region extending from the upstream side-beginning portion 10a of the raw resin-flow path 10 to the "half division portion of a height of the sprue-bush of the present invention", for example. On the other hand, "the downstream side of the raw resin-flow path 10" corresponds to a region extending from the "half division portion of a height of the present invention" to the downstream side-end portion 10b of the raw resin-flow path 10, for example.

The base part 100A includes an upstream raw resin-flow path portion 10A and an upstream cooling medium-flow path portion 20A, the upstream raw resin-flow path portion 10A corresponding to an upstream side region of the raw resin-flow path 10, the upstream cooling medium-flow path portion 20A being located around the upstream raw resin-flow path portion 10A and corresponding to an upstream side region of the cooling medium-flow path 20. The upstream cooling medium-flow path portion 20A of the base part 100A is a flow path having a configuration of a straight pipe and is located around the upstream raw resin-flow path portion 10A.

The shaped part 100B includes a downstream raw resin-flow path portion 10B and a downstream cooling medium-flow path portion 20B, the downstream raw resin-flow path portion 10B corresponding to a downstream side region of the raw resin-flow path 10, the downstream cooling medium-flow path portion 20B being located around the downstream raw resin-flow path portion 10B and corresponding to a downstream side region of the cooling medium-flow path 20. In the sprue-bush 100 of the present invention, the shaped part 100B may be positioned on the base part 100A such that the upstream raw resin-flow path portion 10A in the base part 100A and the downstream raw resin-flow path portion 10B in the shaped part 100B are connected with each other and also such that the upstream cooling medium-flow path portion 20A in the base part 100A and the downstream cooling medium-flow path portion 20B in the shaped part 100B are connected with each other.

As described above, the raw resin-flow path 10 in the sprue-bush 100 is configured such that its width dimension gradually increases from the upstream side to the downstream side, which makes a cooling and subsequent solidification of the melt raw resin in the downstream raw resin-flow path portion 10B difficult compared with that of the melt raw resin in the upstream raw resin-flow path portion 10A. Thus, it is necessary to be suitably able to cool and solidify the melt raw resin in the downstream raw resin-flow path portion 10B. In light the above matters, in an embodiment of the present invention, the downstream cooling medium-flow path portion 20B around the downstream raw resin-flow path 10B is configured to surround the downstream raw resin-flow path portion 10B where the cooling and subsequent solidification of the melt raw resin are difficult. Although not particularly limited, the downstream cooling medium-flow path portion 20B may be configured to have a helical configuration. The "downstream cooling medium-flow path portion 20B" as used herein means a flow path-portion having a less than one-half dimension of the height dimension of the sprue-bush 100 according to the present invention. Namely, the shaped part 100B may be configured to have a less than one-half dimension (i.e., a longitudinal dimension) of the height dimension of the sprue-bush (see FIG. 1).

A surrounding configuration of the downstream cooling medium-flow path portion 20B to the downstream raw resin-flow path portion 10B is based on a consideration that the cooling and subsequent solidification of the melt raw resin in the raw resin-flow path 10 are difficult as the melt raw resin goes to the downstream side due to a gradual increase of the width dimension of the raw resin-flow path 10 from the upstream side to the downstream side of the raw resin-flow path 10. In a case that the downstream cooling medium-flow path portion 20B is located to surround the downstream raw resin-flow path portion 10B, it is possible to transfer a cooling heat to the melt raw resin in the downstream raw resin-flow path portion 10B from any direction in a plan view, the cooling heat being due to the cooling medium flowing through the downstream cooling medium-flow path portion 20B, which makes it possible to suitably transfer the cooling heat to the melt raw resin whose cooling and subsequent solidification are relatively difficult in the downstream raw resin-flow path portion 10B, the cooling heat being due to the cooling medium flowing through the downstream cooling medium-flow path portion 20B. Thus, the melt raw resin in the downstream raw resin-flow path portion 10B can be suitably cooled and subsequently solidified. Therefore, it is possible to reduce a necessary time from a start of an injection of the melt raw resin to an ejection of a molded article, and thus a molding cycle can be shortened.

The sprue-bush 100 according to an embodiment of the present invention may adopt the following aspects.

Figure 7:
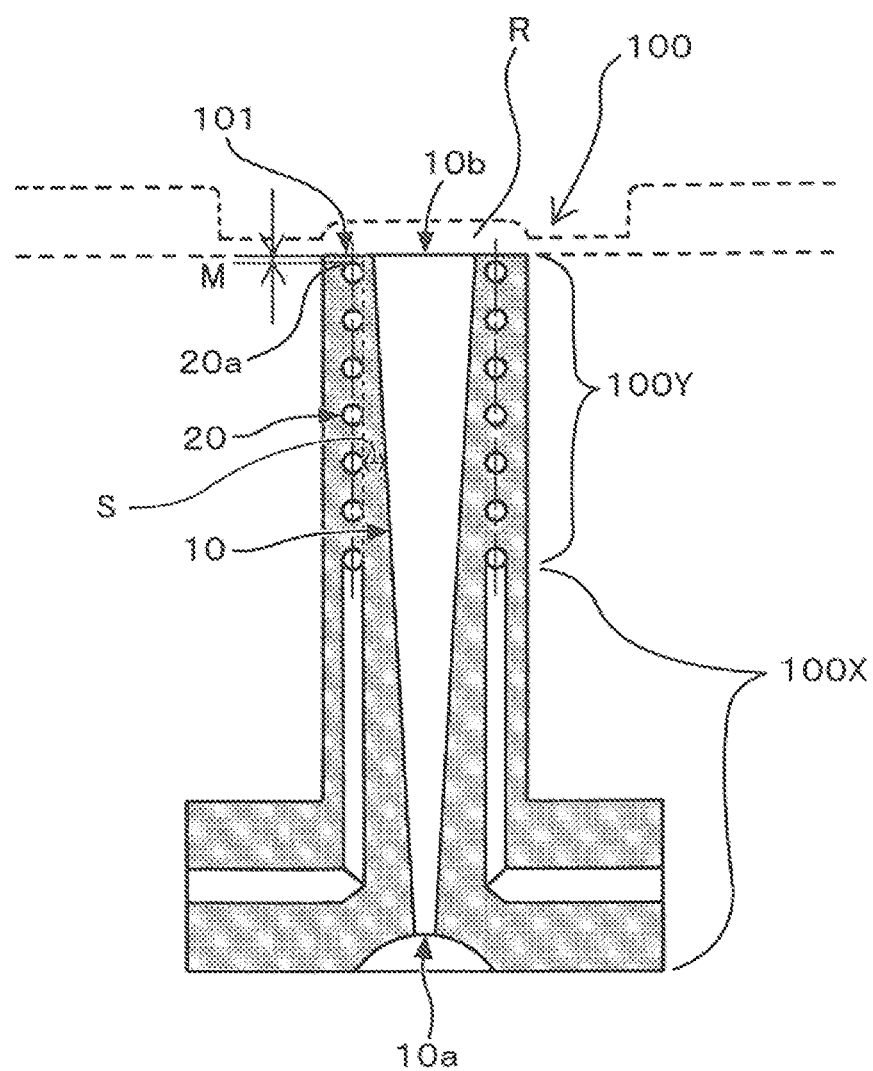
FIG. 7 is a perspective view schematically showing a sprue-bush according to another embodiment of the present invention.

In an aspect, a spaced distance M between a downstream side-end surface 101 of the sprue-bush 100 and a most downstream portion 20a of the cooling medium-flow path 20 is smaller than a spaced distance S between the raw resin-flow path 10 and the cooling medium-flow path 20 (see FIG. 7).

The "downstream side-end surface 101 of the sprue-bush 100" as used herein means a substantially entire end surface of the sprue-bush 100, the end surface directly contacting a mold, more specifically, a runner portion R in the mold, and also a surface including the "downstream end portion 10b of the raw resin-flow path 10". The "most downstream portion of the cooling medium-flow path" as used herein means a portion of the cooling medium-flow path 20 which is faced to the downstream end surface 101 of the sprue-bush 100 at a closest position (see FIG. 7). The "spaced distances S" as used herein means a distance between a portion of the cooling medium-flow path 20 which is closest to the raw resin-flow path 10 and the raw resin-flow path 10 facing the closest portion of the cooling medium-flow path 20, in a downstream side region 100Y of the sprue-bush 100. Namely, the "spaced distance S" substantially means a shortest width dimension between the raw resin-flow path 10 and the cooling medium-flow path 20.

This aspect is characterized in that the spaced distance M between the downstream side-end surface 101 of the sprue-bush 100 and the most downstream portion 20a of the cooling medium-flow path 20 is smaller than the spaced distance S between the raw resin-flow path 10 and the cooling medium-flow path 20. The spaced distance S between the raw resin-flow path 10 and the cooling medium-flow path 20 is generally controlled to be relatively small in terms of an easier transfer of the cooling heat to the melt raw resin in the raw resin-flow path 10, the cooling heat being due to the cooling medium flowing through the cooling medium-flow path 20. In this aspect, the spaced distance M is configured to be further smaller than the spaced distance S. This means that the most downstream portion 20a of the cooling medium-flow path 20 is positioned to be "closer" to the downstream side-end surface 101 of the sprue-bush 100.

Thus, the cooling heat due to the cooling medium flowing through the cooling medium-flow path 20 can be suitably transferred from the most downstream portion 20a to the downstream side-end surface 101 of the sprue-bush 100. Due to the suitable transfer of the cooling heat to the downstream side-end surface 101 of the sprue-bush 100, it is possible to suitably transfer the cooling heat to the melt raw resin in the downstream side-end portion 10b of the raw resin-flow path 10 where the cooling is most difficult. Therefore, the melt raw resin in the downstream side-end portion 10b of the raw resin-flow path 10 can be suitably cooled and subsequently solidified. Furthermore, since the sprue-bush 100 may be arranged to contact the injection mold, the cooling heat due to the cooling medium flowing through the cooling medium-flow passage 20 can be transferred to the injection mold in a contact with the sprue-bush 100, specifically to the runner portion R of the injection mold. As a result, the melt raw resin in the injection mold located in a vicinity of a contact region with the sprue-bush 100 can be also suitably cooled and subsequently solidified.

The distance M between the downstream side-end surface 101 of the sprue-bush 100 and the most downstream portion 20a of the cooling medium-flow path 20 may be 0.1 mm to 5 mm, preferably 0.5 mm to 2 mm.

The distance M between the downstream side-end surface 101 of the sprue-bush 100 and the most downstream portion 20a of the cooling medium-flow path 20 may be a relatively small value such as 0.1 mm to 5 mm. Thus, the cooling heat due to the cooling medium flowing through the cooling medium-flow path 20 can be suitably transferred from the most downstream portion 20a to the downstream side-end surface 101 of the sprue-bush 100. Due to the suitable transfer of the cooling heat to the downstream side-end surface 101 of the sprue-bush 100, it is possible to suitably transfer the cooling heat to the melt raw resin in the downstream side-end portion 10b of the raw resin-flow path 10 where the cooling is most difficult.

In an aspect, a formation region for the downstream side-end surface 101 of the sprue-bush 100 may include or may be composed of a material different from a material composing another region other than the formation region. The "formation region of the downstream side-end surface 101 of the sprue-bush 100" as used herein means a region which includes the downstream side-end surface 101 and a vicinity portion of the downstream side-end surface 101, the vicinity portion corresponding to a region between the downstream side-end surface 101 of the sprue-bush 100 and the most downstream portion 20a of the cooling medium-flow path 20/ a region on the downstream side-end surface 101 as an example although not particularly limited thereto.

In the above, as an embodiment wherein the cooling heat due to the cooling medium is suitably transferred to the melt raw resin at the downstream side-end portion 10b of the raw resin-flow path 10 where the cooling is most difficult, an embodiment wherein the most downstream portion 20a of the cooling medium-flow path 20 is positioned to be "closer" to the downstream side-end surface 101 of the sprue-bush 100 has been described. However, the embodiment wherein the cooling heat is suitably transferred is not limited to the above embodiment. For example, the embodiment wherein the formation region for the downstream side-end surface 101 of the sprue-bush 100 includes the material different from the material composing another region other than the formation region may be adopted.

Specifically a material which is contained in the formation region of the downstream side-end surface 101 of the sprue-bush 100 is a material having a relatively high heat conductivity, the material having the relatively high heat conductivity being at least one to be selected from a group of Ag, Cu, Al, Ni, or the like. Particularly, it is preferable that Al is contained in the formation region of the downstream side-end surface 101 of the sprue-bush 100. On the other hand, a material which is contained in another region other than the formation region of the downstream side-end surface 101 of the sprue-bush 100 is Fe as an example.

The formation region of the downstream side-end surface 101 of the sprue-bush 100 including the material having the relatively high heat conductivity can be formed by a "selective laser sintering method" as described later, the "selective laser sintering method" being a method for forming the shaped part of the sprue-bush 100 including the formation region. In other words, during a formation of the shaped part by the "selective laser sintering method", a material change is performed between a material for a portion corresponding to the "formation region of the downstream side-end surface 101 of the sprue-bush 100" and that of another portion other than the portion corresponding to the "formation region of the downstream side-end surface 101 of the sprue-bush 100". Without being limited to the above, the formation region may be provided by a welding of material having the relatively high heat conductivity which is at least one to be selected from a group of Ag, Cu, Al, Ni, or the like, preferably Al.

Due to a local use of the material having the relatively high heat conductivity, the formation region of the downstream side-end surface 101 of the sprue-bush 100 can suitably function as the "high heat conductivity region", the "high heat conductivity region" having the heat conductivity relatively higher than that of another region other than the formation region. The formation region which suitably functions as the "high heat conductivity region" allows the cooling heat to be effectively transferred from the position of the most downstream portion 20a to the downstream side-end surface 101 of the sprue-bush 100. Due to the effective cooling heat transfer to the downstream side-end surface 101, it is possible to transfer the cooling heat to the melt raw resin in the downstream side-end portion 10b of the raw resin-flow path 10 where the cooling is most difficult, the downstream side-end portion 10b being located in the formation region of the downstream side-end surface 101, the cooling heat being due to the cooling medium. Thus, it is possible to effectively cool and subsequently solidify the melt raw resin in the downstream side-end portion 10b of the raw resin-flow path 10 where the cooling is most difficult. Furthermore, the formation region which suitably functions as the "high heat conductivity region" allows a cooling heat to be effectively transferred to the injection mold contacting the sprue-bush 100, the cooling heat being effectively transferred from the position of the most downstream portion 20a to the downstream side-end surface 101 of the sprue-bush 100. More specifically, the cooling heat can be effectively transferred to the runner portion R of the injection mold contacting the sprue-bush 100. As a result, the melt raw resin in the injection mold located in a vicinity of a contact region with the sprue-bush 100 can be also effectively cooled and subsequently solidified.

Figure 8:
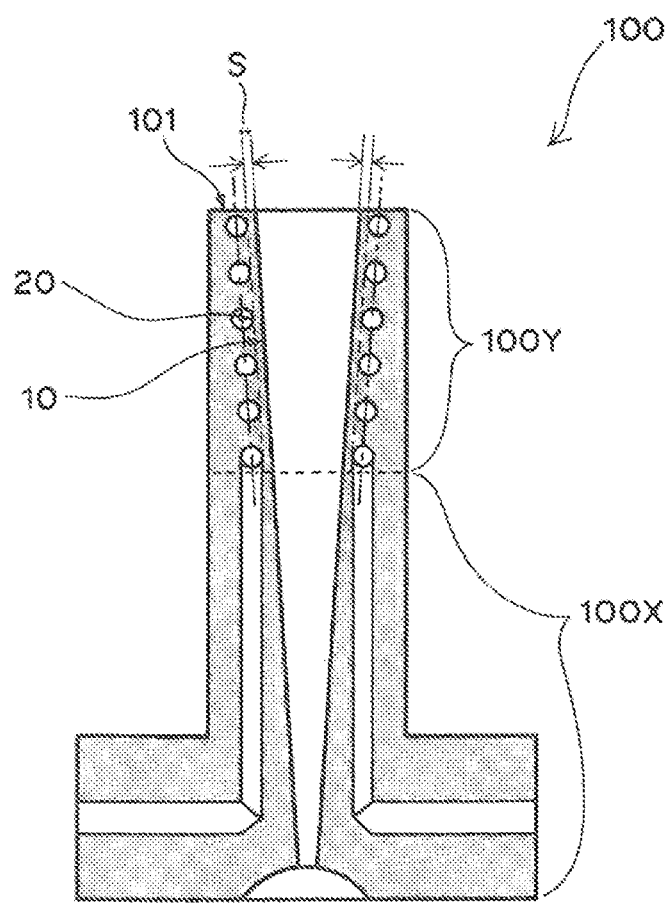
FIG. 8 is a cross-sectional view schematically showing a sprue-bush according to further another embodiment of the present invention.

In an aspect, any spaced distance S may be made substantial constant in a longitudinal direction of the raw resin-flow path 10 at the downstream side region 100Y of the sprue-bush 100, the spaced distance S being defined between the raw resin-flow path 10 and the cooling medium-flow path 20 (see FIG. 8).

In a case that the downstream side of the cooling medium-flow path 20 is configured to surround the raw resin-flow path 10 at the downstream side region 100Y of the sprue-bush 100, it is possible to transfer a cooling heat to the melt raw resin in the downstream side of the raw resin-flow path 10 from any direction in a plan view, the cooling heat being due to the cooling medium flowing through the downstream side of the cooling medium-flow path 20. Then, in a case that any spaced distance S between the raw resin-flow path 10 and the cooling medium-flow path 20 surrounding the raw resin-flow path 10 is made substantial constant in the longitudinal direction of the raw resin-flow path 10, a distance between the downstream side of the cooling medium-flow path 20 surrounding the raw resin-flow path 10 and the downstream side of the raw resin-flow path 10 is made substantial equal at any point in a top plan view. Thus, the cooling heat due to the cooling medium flowing through the downstream side of the cooling medium-flow path 20 can be uniformly transferred to any point of the downstream side of the raw resin-flow path 10. Therefore, the melt raw resin in the downstream side of the raw resin-flow path 10 where a cooling and a subsequent solidification are relatively difficult can be uniformly melt and subsequently solidified.

Figure 9:
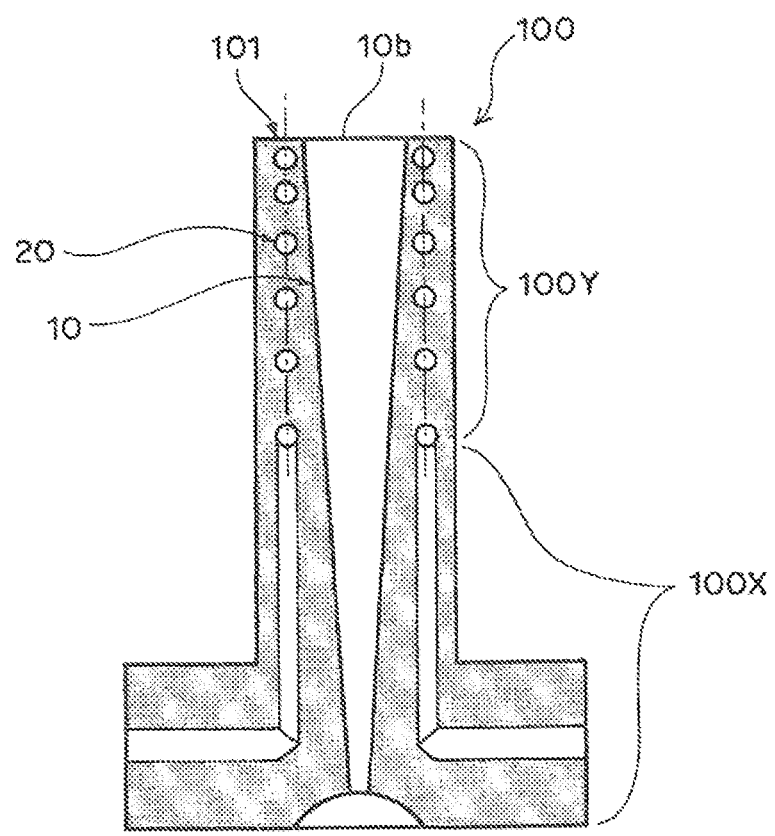
FIG. 9 is a cross-sectional view schematically showing a sprue-bush according to further another embodiment of the present invention.

In an aspect, a pitch of the cooling medium-flow path 20 in a cross-sectional view may gradually become smaller toward the downstream side-end surface 101 of the sprue-bush 100 at the downstream side region 100Y of the sprue-bush 100 (see FIG. 9).

The width-dimension of the raw resin-flow path 10 is configured to gradually increase toward the downstream side-end surface 101 of the sprue-bush 100. The gradual increase of the width-dimension makes a surface area of the cooling medium-flow path 20 larger. Thus, the larger surface area of the cooling medium-flow path 20 makes it difficult to suitably transfer the cooling heat due to the cooling medium flowing through the cooling medium-flow path 20 to the melt raw resin. In particular, this difficulty may be apparent toward the downstream side-end surface 101 of the sprue-bush 100, i.e., toward the downstream side-end portion 10b of the raw resin-flow path 10.

In light of the above, in this aspect, the cooling medium-flow path 20 is configured such that the pitch thereof in the cross-sectional view may gradually become smaller toward the downstream side-end surface 101 of the sprue-bush 100 at the downstream side region 100Y of the sprue-bush 100. Due to an incorporation of such the configuration, the cooling medium-flow path 20 is arranged "densely" in a cross-sectional view in the vicinity of the downstream side-end surface 101 of the sprue-bush 100. Thus, the cooling heat due to the cooling medium can be intensively transferred to the downstream side-end portion 10b of the raw resin-flow path 10 and the vicinity of the downstream side-end portion 10b of the raw res in-flow path 10. As a result, it is possible to effectively transfer the cooling heat to the melt raw resin in the downstream side-end portion 10b and that in the vicinity of the downstream side-end portion 10b.

Figure 10:
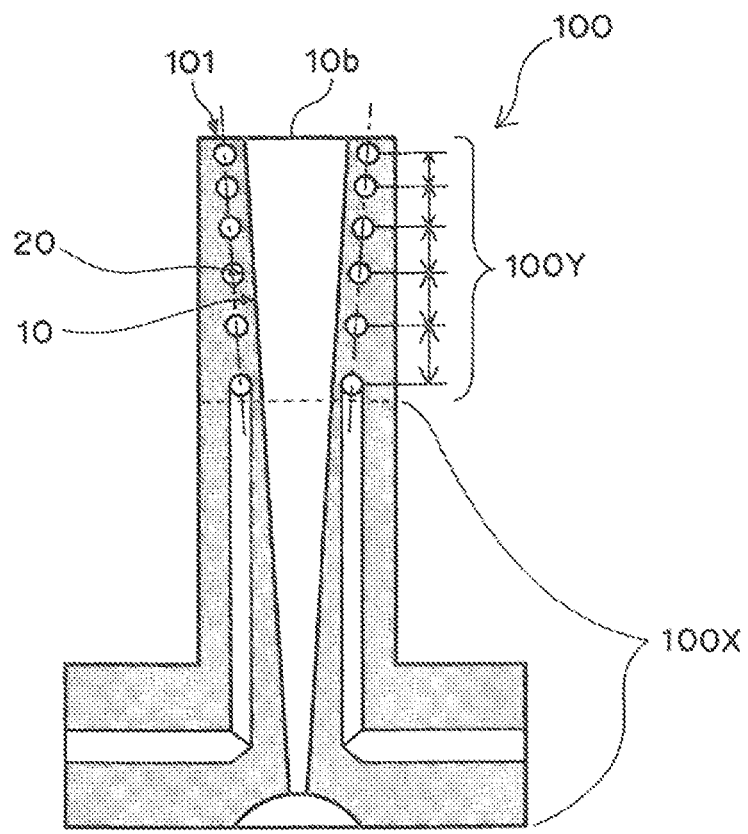
FIG. 10 is a cross-sectional view schematically showing a sprue-bash according to further another embodiment of the present invention.
Figure 11:
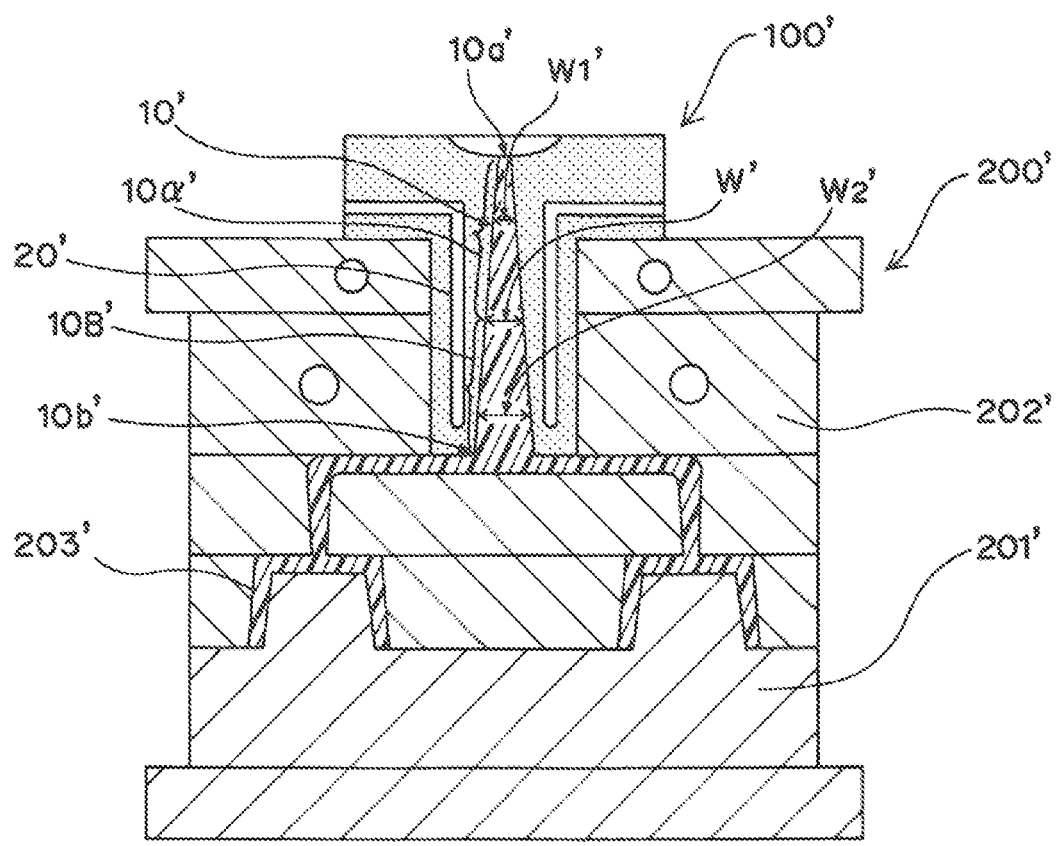
FIG. 11 is a cross-sectional view schematically showing a conventional sprue-bush.

In an aspect, any spaced distance S may be made substantial constant in a longitudinal direction of the raw resin-flow path 10 at the downstream side region 100Y of the sprue-bush 100, the spaced distance S being defined between the raw resin-flow path 10 and the cooling medium-flow path 20, and also a pitch of the cooling medium-flow path 20 in a cross-sectional view may gradually become smaller toward the downstream side-end surface 101 of the sprue-bush 100 at the downstream side region 100Y of the sprue-bush 100 (see FIG. 10).

This aspect is characterized by a combination of a feature of "the substantial constant spaced distance S between the raw resin-flow path 10 and the cooling medium-flow path 20 in the downstream side region 100Y" and a feature of "the pitch of the cooling medium-flow path 20 gradually becoming smaller toward the downstream side-end surface 101 of the sprue-bush 100". By the above combination, this aspect has an advantage in that both of the following first effect and the second effect can be obtained. Firstly, due to the feature of "the substantial constant spaced distance S between the raw resin-flow path 10 and the cooling medium-flow path 20 in the downstream side region 100Y", a distance between the downstream side of the cooling medium-flow path 20 surrounding the raw resin-flow path 10 and the downstream side of the raw resin-flow path 10 is made substantial equal at any point in a top plan view. Thus, the cooling heat due to the cooling medium flowing through the downstream side of the cooling medium-flow path 20 can be uniformly transferred to any point of the downstream side of the raw resin-flow path 10. Therefore, the melt raw resin in the downstream side of the raw resin-flow path 10 where a cooling and a subsequent solidification are relatively difficult can be uniformly melt and subsequently solidified. Secondly, due to the feature of "the pitch of the cooling medium-flow path 20 gradually becoming smaller toward the downstream side-end surface 101 of the sprue-bush 100", the cooling medium-flow path 20 is arranged "densely" in a cross-sectional view in the vicinity of the downstream side-end surface 101 of the sprue-bush 100. Thus, the cooling heat due to the cooling medium can be intensively transferred to the downstream side-end portion 10b of the raw resin-flow path 10 and the vicinity of the downstream side-end portion 10b of the raw resin-flow path 10. As a result, it is possible to effectively transfer the cooling neat to the melt raw resin in the downstream side-end portion 10b and that in the vicinity of the downstream side-end portion 10b.

Hereinafter, a method for manufacturing a sprue-bush of the present invention will be described.

<1. Preparation of Base Part>

Figure 2:
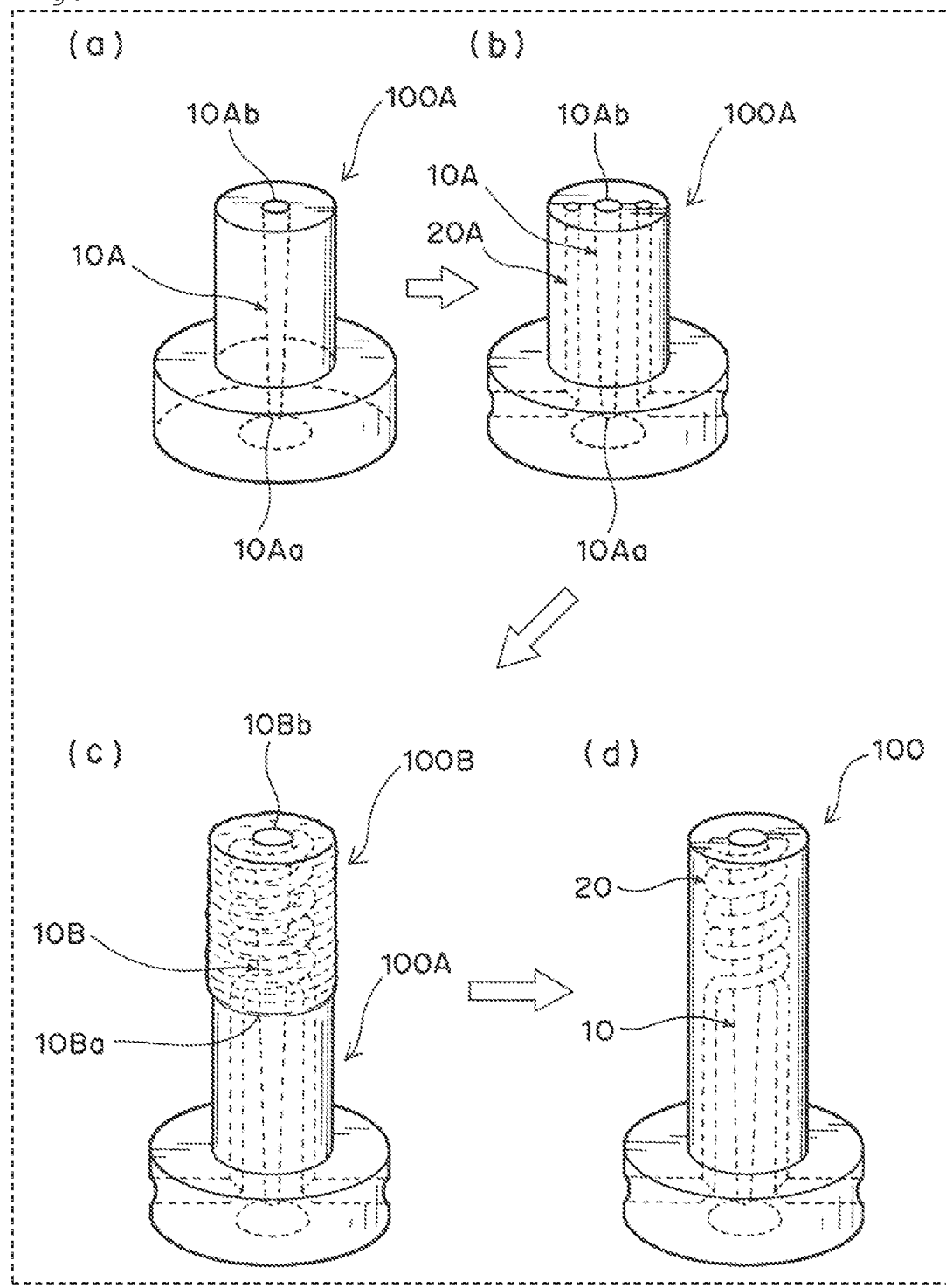
FIG. 2 is a flowchart schematically showing a method for manufacturing a sprue-bush according to the present invention.

As shown in (a) of FIG. 2, a base part 100A including an upstream raw resin-flow path portion 10A therein is prepared, the upstream raw resin-flow path portion 10A extending to pass from an upstream side-beginning portion 10Aa to a downstream side-end portion 10Ab. The "base part 100A" as used herein substantially means an existing sprue-bush. The upstream raw resin-flow path portion 10A may be configured such that its width dimension gradually increases toward the downstream side.

As shown in (b) of FIG. 2, the base part 100A is subjected to a machine process such that an upstream cooling medium-flow path portion 20A is provided in the base part 100A. Specifically, the base part 100A is subjected to the machine process to form the upstream cooling medium-flow path portion 20A in the base part 100A, the upstream cooling medium-flow path portion 20A having a configuration of a straight pipe and being located around the upstream raw resin-flow path portion 10A. Although not particularly limited, in terms of an uniform transfer of the cooling medium heat flowing through the upstream cooling medium-flow path portion 20A to the raw resin in the upstream raw resin-flow path portion 10A, the upstream cooling medium-flow path portion 20A may be positioned to extend in substantial parallel to an extending direction of the upstream raw resin-flow path portion 10A. Furthermore, although not limited, an opening for an inflow and/or an outflow of the cooling medium may be provided on a side portion of an upstream side of the base part 100A. In detail, the cooling medium-flow path 20A may have a continuous configuration from the opening to the straight pipe portion located around the raw resin-flow path 10A. An end mill may be used as a machine tool for the machine process for example. Although not particularly limited, a double-blade ball end mill of a super hard material or the like may be used as the end mill for example. In this manner, the base part 100A including the upstream raw resin-flow path portion 10A and the downstream cooling medium-flow path portion 20A therein is prepared.

<2. Formation of Shaped Part>

In an embodiment of the present, invention, a shaped part 100B to be located on the base part 100A is formed as shown in (c) of FIG. 2. The shaped part 100B can be formed by a "selective laser sintering method" for example.

The "selective laser sintering method" to be used for manufacturing the shaped part 100B is a method which is capable of manufacturing a three-dimensional shaped object by irradiating a powder material with a light beam. The method can produce the three-dimensional shaped object by an alternate repetition of a powder-layer forming and a solidified-layer forming on the basis of the following (i) and (ii):

(i) forming a solidified layer by irradiating a predetermined portion of a powder layer with a light beam, thereby allowing a sintering of the powder at the predetermined portion or a melting and subsequent solidification of the powder at the predetermined portion; and (ii) forming another solidified layer by newly forming a powder layer on the formed solidified layer, followed by similarly irradiating the powder layer with the light beam.

This kind of technology makes it possible to produce the three-dimensional shaped object with its complicated contour shape in a short period of time. The three-dimensional shaped object obtained can be used as a shaped part 100B in a case where a metal powder material is used as the powder material.

Figure 3A:
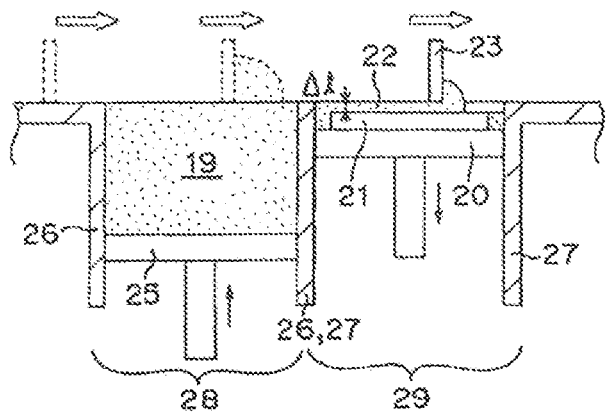
FIG. 3A is a cross-sectional view schematically illustrating a laser-sintering/machining hybrid process upon a formation of a powder layer in accordance with a selective laser sintering method.
Figure 3B:
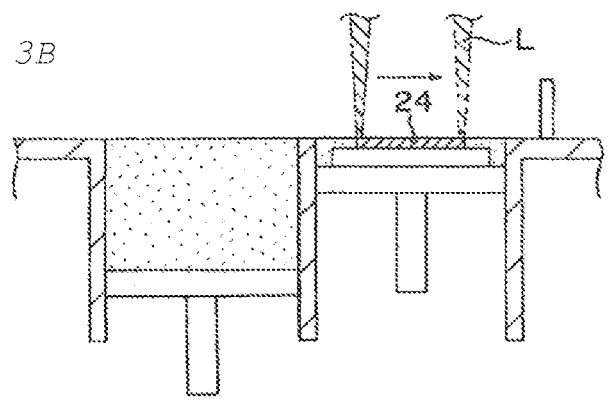
FIG. 3B is a cross-sectional view schematically illustrating a laser-sintering/machining hybrid process upon a formation of a solidified layer in accordance with a selective laser sintering method.
Figure 3C:
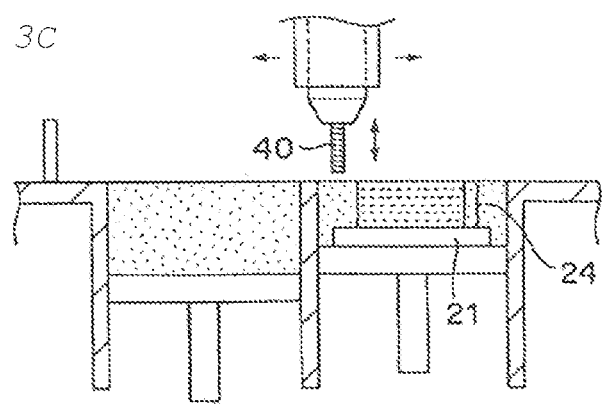
FIG. 3C is a cross-sectional view schematically illustrating a laser-sintering/machining hybrid process in a process of a stacking in accordance with a selective laser sintering method.

In a case of an example wherein the metal powder is used as the material to manufacture the three-dimensional shaped object by the selective laser sintering method, as shown in FIGS. 3A-3C, a powder layer 22 with its predetermined thickness is firstly formed on a base plate 21 by a movement of a squeegee blade 23 (see FIG. 3A). Then, a predetermined portion of the powder layer 22 is irradiated with a light beam L to form a solidified layer 24 (see FIG. 3B). Another powder layer is newly provided on the formed solidified layer, and is irradiated again with the light beam to form another solidified layer. In this way, the powder-layer forming and the solidified-layer forming are alternately repeated, and thereby allowing the solidified layers 24 to be stacked with each other (see FIG. 3C). The alternate repetition of the powder-layer forming and the solidified-layer forming leads to a production of a three-dimensional shaped object with a plurality of the solidified layers stacked therein.

Particularly, in an embodiment of the present invention, as shown in (c) of FIG. 2, the shaped part 100B is formed by the selective laser sintering method such that the shaped part 100B has a downstream raw resin-flow path portion 10B and a downstream cooling medium-flow path portion around the downstream raw resin-flow path portion 10B respectively in the shaped part 100B. The raw resin-flow path 10 in the sprue-bush 100 to be finally obtained may be configured such that its width dimension gradually increases from the upstream side toward the downstream side (see (d) of FIG. 2). In this case, since the raw resin-flow path 10 in the sprue-bush 100 to be finally obtained may be configured such that its width dimension gradually increases from the upstream side toward the downstream side, a cooling and subsequent solidification of the melt raw resin in the downstream side may be difficult. Thus, it is necessary to suitably cool and subsequently solidify the melt raw resin in the downstream side of the raw resin-flow path 10 of the sprue-bush 100 to be finally obtained, that is, in the downstream raw resin-flow path portion 10B.

In light of the above matters, in an embodiment of the present invention, the downstream cooling medium-flow path portion 20B is located to surround the downstream side of the raw resin-flow path 10, that is, the downstream raw resin-flow path portion 10B which may be a portion where the cooling and subsequent solidification of the melt raw resin are relatively difficult. Although not particularly limited, the downstream cooling medium-flow path portion 20B having a helical configuration may be located. The "downstream cooling medium-flow path portion 20B" as used herein means a flow path-portion having a less than one-half dimension of the height dimension of the sprue-bush 100 according to the present invention. Namely, the shaped part 100B may be located on the base part 100A such that the shaped part 100B has a less than one-half dimension (i.e., a longitudinal dimension) of the height dimension of the sprue-bush (see FIGS. 1, 2(c) and 2(d)).

A surrounding configuration of the downstream cooling medium-flow path portion is based on a consideration that the cooling and subsequent solidification of the melt raw resin in the raw resin-flow path 10 are difficult as the melt, raw resin goes to the downstream side due to a gradual increase of the width dimension of the raw resin-flow path 10 in the sprue-bush 100 from the upstream side to the downstream side of the raw resin-flow path 10. In a case that the downstream cooling medium-flow path portion 20B is located to surround the downstream raw resin-flow path portion 10B, it is possible to transfer a cooling heat to the melt raw resin in the downstream raw resin-flow path portion 10B from any direction in a plan view, the cooling heat being due to the cooling medium flowing through the downstream cooling medium-flow path portion 20B, which makes it possible to suitably transfer the cooling heat to the melt raw resin whose cooling and subsequent solidification are relatively difficult in the downstream raw resin-flow path portion 10B, the cooling heat being due to the cooling medium flowing through the downstream cooling medium-flow path portion 20B. Thus, the melt raw resin in the downstream raw resin-flow path portion 10B can be suitably cooled and subsequently solidified. Therefore, it is possible to reduce a necessary time from a start of an injection of the melt raw resin to an ejection of the molded article, and thus a molding cycle can be shortened.

Furthermore, the following aspect can be adopted to form the downstream raw resin-flow path portion 10B and the downstream cooling medium-flow path portion 20B to be provided to surround the downstream raw resin-flow path portion 10B. Firstly, upon a formation of a solidified layer, a non-irradiated portion which is not partially irradiated with the light beam is formed. Specifically, upon the formation of the solidified layer by the selective laser sintering method, a predetermined region to be the downstream raw resin-flow path portion 10B and the downstream cooling medium-flow path portion 20B is not irradiated with the light beam to form the non-irradiated portion, the downstream cooling medium-flow path portion 20B being located to surround the downstream raw resin-flow path portion 10B. After a formation of the non-irradiated portion, powders which may exist in the non-irradiated portion are finally removed. Thus, it is possible to form the downstream raw resin-flow path portion 10B and the downstream cooling medium-flow path portion 20B located to surround the downstream raw resin-flow path portion 10B in the shaped part 100B.

<3. Location of Shaped Part on Base Part>

In an embodiment of the present invention, the sprue-bush 100 can be finally obtained by a location of the shaped part 100B on the base part 100A. Specifically, the sprue-bush 100 can be finally obtained by locating the shaped part 100B on the base part 100A such that the upstream raw resin-flow path portion 10A of the base part 100A and the downstream raw resin-flow path portion 10B of the shaped part 100B are connected with each other and the upstream cooling medium-flow path portion 20A of the base part 100A and the downstream cooling medium-flow path portion 20B to be provided to surround the downstream raw resin-flow path portion 10B are connected with each other.

<4. Performance of Machine Process>

Finally, as shown in (d) of FIG. 2, it is preferable that a surface of the sprue-bush 100 of the present invention, particularly a surface of a location region of the shaped part 100B is subjected to a machine process, the sprue-bush 100 being obtained by the location of the shaped part 100B on the base part 100A.

Figure 6:
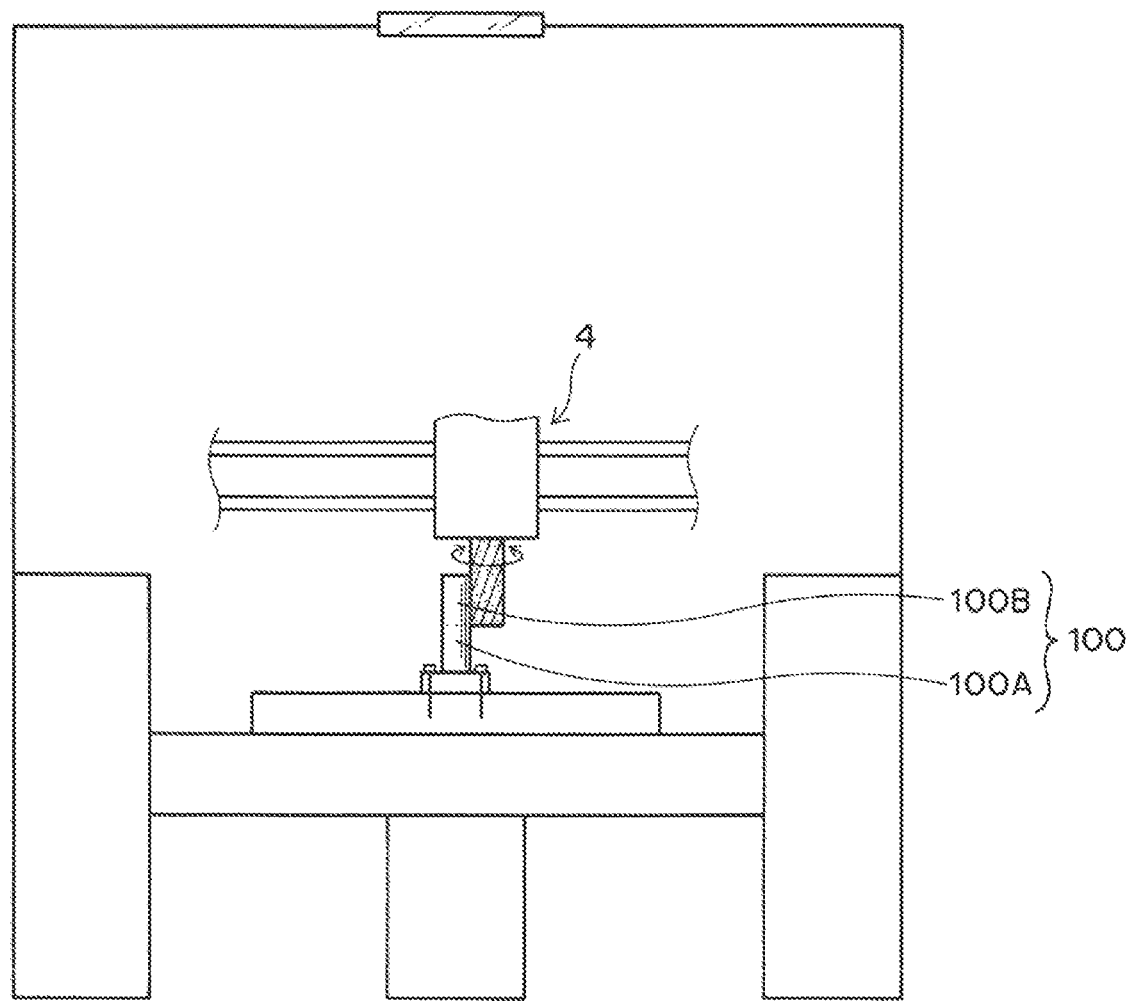
FIG. 6 is a cross-sectional view schematically showing an embodiment wherein a surface of a sprue-bush according to the present invention is subjected to a machine process.

The shaped part 100B to be obtained by the selective laser sintering method has a relatively rough surface. For example, the shaped part 100B has a surface with its surface roughness of about several hundred μm Rz. The surface roughness is caused by an adherence of the powder to a surface of the solidified layer for forming the shaped part 100B. Upon a formation of the solidified layer, due to a conversion of an energy of the light beam to a heat, the powder at a predetermined portion of the powder layer irradiated with the light beam is sintered or melted and subsequently solidified. At this time, a temperature of powders around the predetermined portion may also increase, and thus the surrounding powder adheres to the surface of the solidified layer. In this way, the adherence of the powder may cause the shaped part 100B, i.e., the three-dimensional shaped object, which has the surface roughness. In light of the above matters, it is preferable that the surface of the sprue-bush 100 of the present invention, particularly the surface of the location region of the shaped part 100B is subjected to the machine process, the sprue-bush 100 being obtained by the location of the shaped part 100B on the base part 100A (see FIG. 6).

The manufacturing method of the present invention may adopt the following aspect.

In an aspect, the shaped part 100B may be located on the base part 100A by a performance of a formation of the shaped part 100B on the base part 100A.

Figure 4:
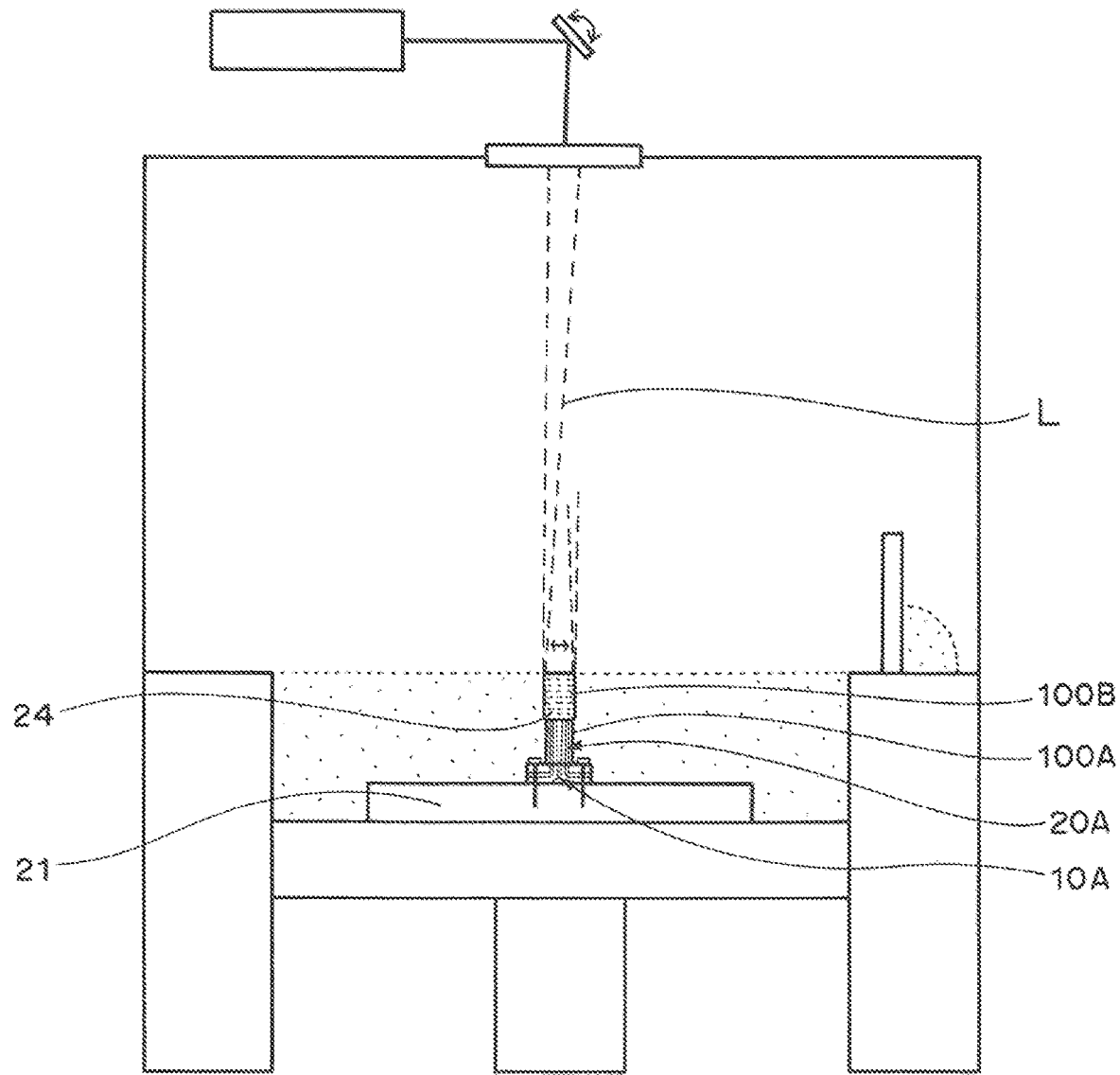
FIG. 4 is a cross-sectional view schematically showing an embodiment wherein a formation of a shaped part is performed on a base part.

Specifically, as shown in FIG. 4, the base part 100A including the upstream raw resin-flow path portion 10A and the upstream cooling medium-flow path portion 20A therein is fixed on the base plate 21. After the fixing of the base part 100A, a formation of the shaped part 100B is performed on the fixed base part 100A in accordance with the selective laser sintering method such that the shaped part 100B has the downstream raw resin-flow path portion and the downstream cooling medium-flow path portion provided to surround the downstream raw resin-flow path portion therein. Thus, the sprue-bush 100 of the present invention can b obtained. In this case, it is preferable that the formation of the shaped part 100B is performed on the base part 100A such that the upstream raw resin-flow path portion 10A in the base part 100A and the downstream raw resin-flow path portion in the shaped part 100B are connected with each other and also such that the upstream cooling medium-flow path portion 20A in the base part 100A and the downstream cooling medium-flow path portion in the shaped part 100B are connected with each other.

In a case that the formation of the shaped part 100B is performed on the base part 100A, the solidified layer, i.e., a composition element of the shaped part 100B, is formed by irradiating a predetermined portion of the powder layer located on the base part 100A with the light beam L. In this case, due to the melt and subsequent solidification of the metal powder on the base part 100A by the irradiation of the predetermined portion with the light beam L, it is possible to improve a connection-strength between the solidified layer obtained from the melt and subsequently solidified metal powder and the base part 100A. In order to avoid a redundant description, this paragraph has no description as to a method for forming the downstream raw resin-flow path portion of the shaped part 100B and the downstream cooling medium-flow path portion to be located to surround the downstream raw resin-flow path portion in accordance with the selective laser sintering method.

In an aspect, a surface 101A of the base part 100A on which the formation of the shaped part is performed is subjected to a rough process prior to a formation of the shaped part on the base part 100A.

Figure 5:
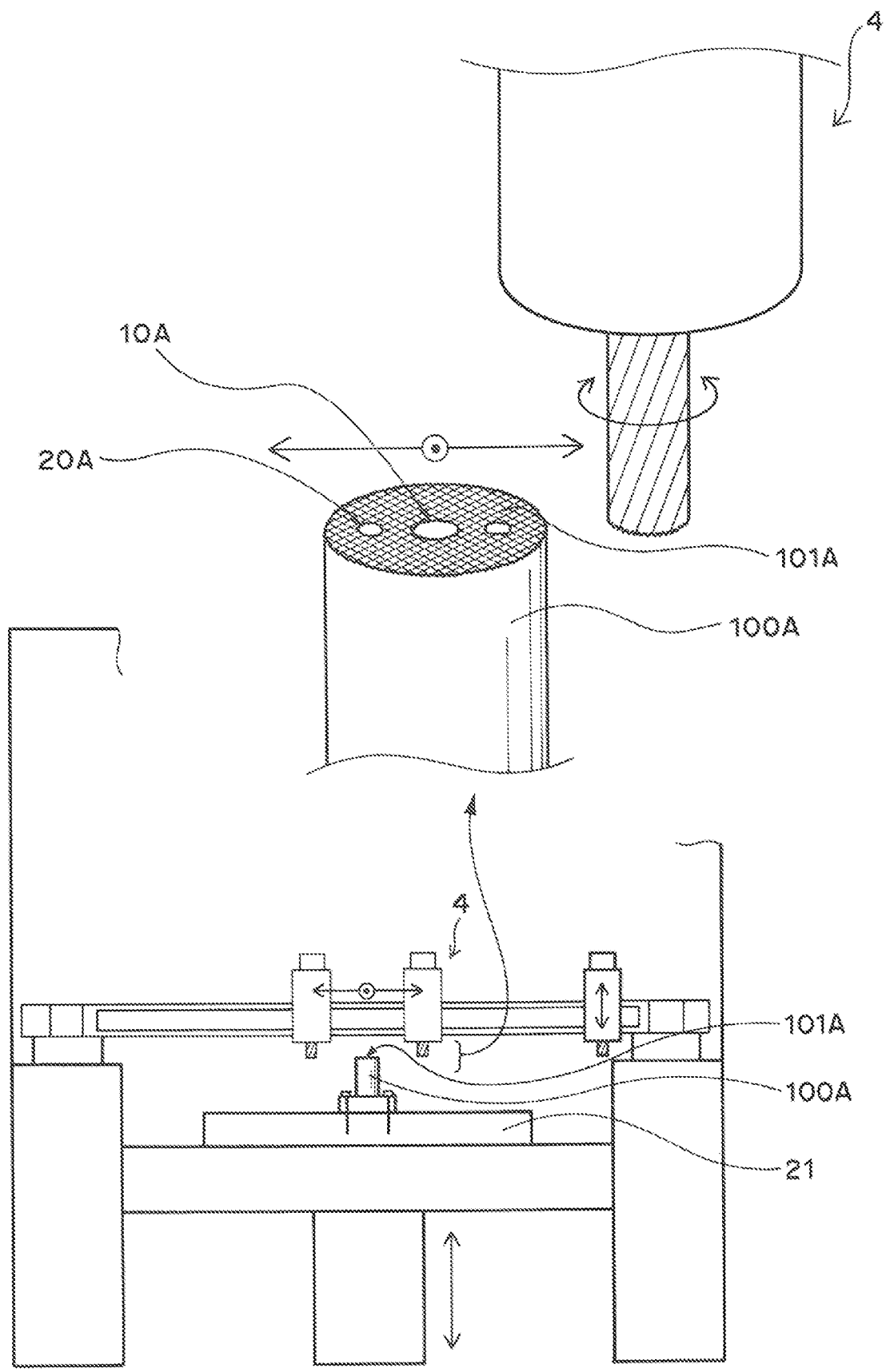
FIG. 5 is a cross-sectional view schematically showing an embodiment wherein a base part is subjected to a rough process.

Although not particularly limited, as shown in FIG. 5, the base part 100A including the upstream raw resin-flow path portion 10A and the upstream cooling medium-flow path portion 20A therein is fixed on the base plate 21 for example. After the fixing of the base part 100A, the surface 101A of the base part 100A on which the shaped part is located may be subjected to a rough process prior to the formation of the shaped part on the fixed base part 100A, the rough process being due to a performance of the machine process by a use of the machine tool 4. The surface 101A of the base part 100A may be a top surface of the base part 100A for example. Specifically, the machine process may be performed by a horizontal direction-movement of the machine tool 4 to subject the surface 101A of the base part 100A on which the shaped part is located to the rough process. An end mill may be used as the machine tool 4 for example. Although not particularly limited, a double-blade ball end mill of a super hard material or the like may be used as the end mill for example. Without being limited to the machine process, the surface 101A of the base part 100A on which the shaped part is located may be subjected to a blast process or a laser process for the rough process for example. The rough process makes a roughness of the surface 101A larger, which allows a surface area of the surface 101A of the base part 100A on which the shaped part is located larger compared with its surface area before the rough process. Thus, at a stage of a formation of the solidified layer on the base part 100A for forming the shaped part on the base part 100A, it is possible to make a contact region between the solidified layer and the surface 101A of the base part 100A on which the shaped part is located relatively larger. Due to the larger roughness of the surface 101A of the base part 100A where the shaped part is located, it is possible to form the solidified layer on the surface 101A of the base part 100A where the shaped part located such that the solidified layer is mated with the surface 101A of the base part 100A. Therefore, a connection-strength between the base part 100A and the shaped part can be further improved as a whole.

In an embodiment, the shaped part 100B may be formed at a location other than the base part 100A and the shaped part 100B formed may be disposed on the base part 100A (see FIG. 1).

Specifically, a formation of the shaped part 100B is performed in advance at a location other than the base part 100A in accordance with the selective laser sintering method, the shaped part 100B having the downstream raw resin-flow path portion 10B and the downstream cooling medium-flow path portion 20B to be located to surround the downstream raw resin-flow path portion 10B in the shaped part 100B. After the formation of the shaped part 100 in accordance with the selective laser sintering method, an interconnection of the shaped part 100B and the base part 100A is performed (see FIG. 1). Specifically, the interconnection of the shaped part 100B and the base part 100A is performed to locate the formed shaped part 100B on the base part 100A including the upstream raw resin-flow path portion 10A and the upstream cooling medium-flow path portion 20A in the base part 100A. It is preferable that a fixing of the formed shaped part 100B on the base part 100A is performed by a brazing or the like. Thus, the sprue-bush 100 of the present invention can be obtained. As to the base part 100A, it is necessary to form the upstream cooling medium-flow path portion 20A having the configuration of the straight pipe around the upstream raw resin-flow path portion 10A by the machine process. According to this aspect, the shaped part 100B is formed independently, which makes it possible to perform simultaneous parallel formations of a formation of the upstream cooling medium-flow path portion 20A having the configuration of the straight pipe and a formation of the shaped part 100B. Due to the simultaneous parallel formations, a manufacturing time for the sprue-bush 100 of the present invention can be shortened as a whole.

In an aspect, the base part may be subjected to a machine process to decrease a height dimension of the base part before the shaped part is located on the base part.

As described above, the sprue-bush of the present invention can be obtained by the location of the shaped part on the base part. The base part substantially means the existing sprue-bush and thus the base part can be used as an injection molding part even if another part (i.e., the shaped part) is not intentionally located on the base part itself. As a result, the location of the shaped part on the base part without a particular processing of the base part may make a dimension of the sprue-bush of the present invention to be finally obtained larger as a whole compared with a desired dimension thereof. In light of the above matters, it is preferable to subject the existing sprue-bush to be used as the base part to the machine process to perform a dimension adjustment for making a dimension of the existing sprue-bush smaller compared with a dimension thereof before the machine process. Specifically, the base part, that is, the existing sprue-bush generally includes a flange portion and an extension portion on the flange portion. Thus, the base part may be subjected to the machine process to make a longitudinal dimension of the extension portion of the base part smaller, which may lead to a dimension reduction of the base part. As to a degree of the dimension reduction of the base part, it is preferable to determine the degree in view of a dimension of the sprue-bush of the present invention to be finally obtained. As a result, the location of the shaped part on the base part having the adjusted dimension make it possible to finally obtain the sprue-bush having a desirable dimension in the present invention.

Although the sprue-bush according to an embodiment of the present invention and the method for manufacturing thereof have been hereinbefore described, the present invention is not limited to the above embodiment. It will be readily appreciated by the skilled person that various modifications are possible without departing from the scope of the present invention.

It should be noted that an embodiment of the present invention as described above includes the following preferable aspects:

The first aspect: A method for manufacturing a sprue-bush, wherein a shaped part is located on a base part to manufacture the sprue-bush, the base part comprising a raw resin-flow path and a cooling medium-flow path, wherein, in the shaped part, a downstream raw resin-flow path portion is located and a downstream cooling medium-flow path portion is also located, the downstream raw resin-flow path portion corresponding to a downstream side region of a raw resin-flow path of the sprue-bush, the downstream cooling medium-flow path portion being positioned around the downstream raw resin-flow path portion and corresponding to a downstream side region of a cooling medium-flow path of the sprue-bush, and wherein the downstream cooling medium-flow path portion is located to surround the downstream raw resin-flow path portion.

The second aspect: The method according to the first aspect, wherein the shaped part is located on the base part such that the shaped part has a less than one-half dimension of a height dimension of the sprue-bush.

The third aspect: The method according to the first or second aspect, wherein the shaped part is located on the base part by a performance of a formation of the shaped part on the base part.

The fourth aspect: The method according to the third aspect, wherein a surface of the base part on which the shaped part is located is subjected to a rough process prior to a formation of the shaped part.

The fifth aspect: The method according to the first or second aspect, wherein the shaped part is formed at a location other than the base part and the shaped part formed is disposed on the base part.

The sixth aspect: The method according to any one of the first to fifth aspects, wherein the base part is subjected to a machine process to decrease a height dimension of the base part before the shaped part is located on the base part.

The seventh aspect: The method according to any one of the first to sixth aspects, wherein a formation of the shaped part is performed in accordance with a selective laser sintering method.

The eighth aspect: A sprue-bush, comprising a raw resin-flow path and a cooling medium-flow path located around the raw resin-flow path,
 wherein the sprue-bush is composed of a base part and a shaped part, the shaped part being located on the base part,
 wherein the base part has an upstream raw resin-flow path portion and an upstream cooling medium-flow path, the upstream raw resin-flow path portion corresponding to an upstream side region of the raw resin-flow path, the upstream cooling medium-flow path portion being positioned around the upstream raw resin-flow path portion and corresponding to an upstream side region of the cooling medium-flow path,
 wherein the shaped part has a downstream raw resin-flow path portion and a downstream cooling medium-flow path portion, the downstream raw resin-flow path portion corresponding to a downstream side region of the raw resin-flow path, the downstream cooling medium-flow path portion being positioned around the downstream raw resin-flow path portion and corresponding to a downstream side region of the cooling medium-flow path, and
 wherein the downstream cooling medium-flow path portion of the shaped part is located to surround the downstream raw resin-flow path portion.

The ninth aspect: The sprue-bush according to the eighth aspect, wherein any spaced distance is made substantial constant in a longitudinal direction of the raw resin-flow path at the downstream side region of the sprue-bush, the spaced distance being defined between the raw resin-flow path and the cooling medium-flow path.

The tenth aspect: The sprue-bush according to the eighth or ninth aspect, wherein the shaped part is configured to have a less than one-half dimension of a height dimension of the sprue-bush.

INDUSTRIAL APPLICABILITY

The sprue-bush according to an embodiment of the present invention can be used to incorporate a melt raw resin injected from an injection mechanism into a mold cavity composed of one of mold parts (i.e., a core side) and other of mold parts (i.e., a cavity side) in an injection mold.

CROSS REFERENCE TO RELATED PATENT APPLICATION

The present application claims the right of priority of Japanese Patent Application No. 2016-129264 (filed on Jun. 29, 2016, the title of the invention: "SPRUE-BUSH AND METHOD FOR MANUFACTURING SPRUE-BUSH"), the disclosure of which is incorporated herein by reference.

EXPLANATION OF REFERENCE NUMERALS

100 Sprue-bush
100A Base part
100B Shaped part
101A Surface of base part on which shaped part is located
10 Raw resin-flow path of sprue bush
10A Upstream raw resin-flow path portion
10B Downstream raw resin-flow path portion
20 Cooling medium-flow path of sprue-bush
20A Upstream cooling medium-flow path portion
20B Downstream cooling medium-flow path portion

The invention claimed is:

1. A method for manufacturing a sprue-bush, the method comprising:
    forming a shaped part having a downstream raw resin-flow path portion and a downstream cooling medium-flow path portion therein such that the downstream cooling medium-flow path portion is positioned around the downstream raw resin-flow path portion and is also located to surround the downstream raw resin-flow path portion, the downstream raw resin-flow path portion corresponding to a downstream side region of a raw resin-flow path of the sprue-bush, the downstream cooling medium-flow path portion corresponding to a downstream side region of a cooling medium-flow path of the sprue-bush; and
    locating the shaped part on a base part to manufacture the sprue-bush, the base part comprising a raw resin-flow path and a cooling medium-flow path therein,
    wherein the shaped part is located on the base part by a performance of a formation of the shaped part on the base part in accordance with a selective laser sintering method, and
    a formation of the base part is not performed in accordance with the selective laser sintering method.

2. The method according to claim 1, wherein the shaped part is located on the base part such that the shaped part has a less than one-half dimension of a height dimension of the sprue-bush.

3. The method according to claim 1, wherein a surface of the base part on which the shaped part is located is subjected to a rough process prior to the formation of the shaped part.

4. The method according to claim 1, wherein the shaped part is formed at a location other than the base part and the formed shaped part is disposed on the base part.

5. The method according to claim 1, wherein the base part is subjected to a machine process to decrease a height dimension of the base part before the shaped part is located on the base part.

6. The method according to claim 1, wherein the base part includes an existing sprue-bush.

7. A method for manufacturing a sprue-bush, the method comprising:
    forming a shaped part having a downstream raw resin-flow path portion and a downstream cooling medium-flow path portion therein such that the downstream cooling medium-flow path portion is positioned around the downstream raw resin-flow path portion and is also located to surround the downstream raw resin-flow path portion, the downstream raw resin-flow path portion corresponding to a downstream side region of a raw resin-flow path of the sprue-bush, the downstream cooling medium-flow path portion corresponding to a downstream side region of a cooling medium-flow path of the sprue-bush; and
    locating the shaped part on a base part to manufacture the sprue-bush, the base part comprising a raw resin-flow path and a cooling medium-flow path therein, wherein
    the cooling medium-flow path of the base part and the downstream cooling medium-flow path portion comprise a cooling medium-flow path of the sprue-bush, and wherein
    a pitch of the cooling medium-flow path of the sprue-bush in a cross-sectional view gradually becomes smaller toward a downstream side-end surface of the sprue-bush at a downstream side region of the sprue-bush.

* * * * *